(12) United States Patent
Kawashima et al.

(10) Patent No.: US 6,220,982 B1
(45) Date of Patent: Apr. 24, 2001

(54) IDLER PULLEY

(75) Inventors: Kazuki Kawashima; Tadahisa Tanaka, both of Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/162,728

(22) Filed: Sep. 30, 1998

(51) Int. Cl.⁷ .............................. F16H 7/20; F16C 27/00
(52) U.S. Cl. ............................................ 474/199; 384/536
(58) Field of Search .................................. 474/171, 112, 474/43, 199, 168, 170; 384/535, 536, 546, 547, 295, 537

(56) References Cited

U.S. PATENT DOCUMENTS

| | | | |
|---|---|---|---|
| 1,627,558 | * 5/1927 | Grunwald | 474/199 |
| 1,903,776 | * 4/1933 | Clark et al. | 474/199 X |
| 2,230,744 | * 2/1941 | Disbro | 384/536 |
| 4,362,525 | * 12/1982 | Sproul | 474/117 |
| 4,516,962 | * 5/1985 | Brandenstein et al. | 474/199 X |
| 5,120,279 | * 6/1992 | Rabe | 474/161 |
| 5,728,020 | * 3/1998 | Muranaka et al. | 474/199 |

* cited by examiner

Primary Examiner—David A. Bucci
Assistant Examiner—Marcus Charles
(74) Attorney, Agent, or Firm—Arent Fox Kintner Plotkin & Kahn, PLLC

(57) ABSTRACT

An object of the present invention, in an idler pulley having a pulley main body formed of steel sheet, is to prevent the pulley main body and the outer ring of a bearing from creeping and the pulley main body from slipping off. An idler pulley according to the invention comprises a pulley main body adapted to have a belt entrained therearound, a ball bearing fitted in the pulley main body, and a shaft member fitted in the inner ring of the ball bearing, wherein a layer of a soft metal whose Young's modulus is lower than those of the pulley main body and the outer ring of the bearing is interposed between the inner surface of the pulley main body of steel sheet and the outer surface of the outer ring of the bearing. When a belt is entrained, this soft metal layer elastically deforms to thereby function to fill a clearance which develops between the pulley main body and the outer ring of the bearing, thereby minimizing the decrease of the joining force between the pulley main body and the outer ring of the bearing, thus preventing drawbacks, such as creep, from occurring.

7 Claims, 3 Drawing Sheets

FIG. 5

| BELT TENSION (kgf) | 60 | 120 | 180 | 240 | 300 |
|---|---|---|---|---|---|
| MAXIMUM VALUE OF CLEARANCE s (μm) | 0.8 | 1.6 | 2.4 | 3.2 | 4 |

IDLER PULLEY

BACKGROUND OF THE INVENTION

The present invention relates to an idler pulley, particularly to an idler pulley adapted to have entrained therearound a timing belt for automobile engines or an auxiliary machine driving belt, such belt being destined to be heavily loaded.

Idler pulleys are installed to increase the wrapping angle of a belt, such as a timing belt for automobile engines or an auxiliary machine driving belt, so as to impart a suitable tension to the belt.

Some idler pulleys are of the type in which a pulley main body formed of a steel plate and having a pulley peripheral surface around which a belt is entrained is force-fitted on the outer ring of a rolling bearing, the pulley main body having a phosphate treatment applied thereto to prevent corrosion, etc.

As shown in FIG. 3, when this type of idler pulley is subjected to a load (radial load) from a belt entrained therearound, the pulley main body 1 and bearing 2 are slightly deformed. However, since the deformation patterns of the pulley main body 1 and bearing 2 differ, a slight clearance s is defined between the two (specifically, between the inner surface 1a1 of the pulley main body 1 and the outer surface 2b1 of the outer ring 2b of the bearing 2). This clearance s becomes wider as the radial force L from the belt increases, thus decreasing the joining force between the pulley main body 1 and the outer ring 2b of the bearing 2. For example, for an idler pulley in which the outer diameter of the outer ring 2b of the bearing 2 is 68 mm, the maximum value of said clearance s varies with the belt tension, as shown in FIG. 5.

Therefore, when this type of idler pulley is used with a belt subjected to a heavy radial load, e.g., a timing belt, it receives a rotating force with a weak joining force exerted between the pulley main body 1 and the outer ring 2 of the bearing 2, so that relative rotation (creep) occurs between the pulley main body 1 and the outer ring 2b of the bearing 2, resulting in the wear of the fit surfaces of the pulley main body 1 and the outer ring 2b of the bearing 2. Further, the pulley main body 1 is subjected to a lateral force as when the belt shifts sideways, incurring the possibility of slipping off the bearing outer ring 2b.

Particularly, in the case where the pulley main body is formed of thin steel sheet, it tends to deform and a relatively large clearance develops, thus leading to a problem that phenomena, such as the creep described above, tend to occur.

SUMMARY OF THE INVENTION

An object of the invention, in such idler pulley having a pulley main body of steel sheet, is to prevent the creeping of the pulley main body and the outer ring of the bearing and the slipping-off of the pulley main body.

To achieve said object, an idler pulley according to the present invention is of the type in which the pulley main body of steel sheet having a pulley peripheral surface adapted to have a belt entrained therearound is force-fitted on the outer ring of a rolling bearing, said idler pulley having a layer of a metal interposed between the pulley main body of steel sheet and the outer ring of the rolling bearing, the Young's modulus of said metal being lower than those of the steel sheet pulley main body and the outer ring of the rolling bearing.

This metal layer is formed, for example, by plating with a metal whose Young's modulus is lower than those of the steel sheet pulley main body and the outer ring of the rolling bearing, applied to the inner surface of the pulley main body of steel sheet and/or the outer surface of the outer ring of the bearing.

As for metals which are lower in Young's modulus than the pulley main body of steel sheet and the outer ring of the rolling bearing, there are, for example, zinc, tin, gold, silver and copper.

Further, it is preferable that the thickness of the metal layer and the plated thickness be 5–20 μm and that the pulley main body of steel sheet have a larger width than that of the outer ring of the bearing.

That is, the idler pulley of the invention has a layer of a soft metal whose Young's modulus is lower than those of the pulley main body and the outer ring of the bearing, said layer being interposed between the inner surface of the pulley main body of steel sheet and the outer surface of the outer ring of the bearing. When a belt is entrained, this soft metal layer is elastically deformed to thereby act to fill the clearance defined between the pulley main body and the outer ring of the bearing; therefore, it is possible to prevent a decrease in the joining force between the pulley main body and the outer ring of the bearing and an occurrence of drawbacks, such as creep.

BRIEF DESCRIPTION OF THE DRAWINGS

FIG. 5 is a table showing the relationship between the belt tension and the maximum value of the clearance in a conventional idler pulley.

DESCRIPTION OF THE PREFERRED EMBODIMENTS

Embodiments of the idler pulley of the invention will now be described with reference to the drawings.

Figure 1:
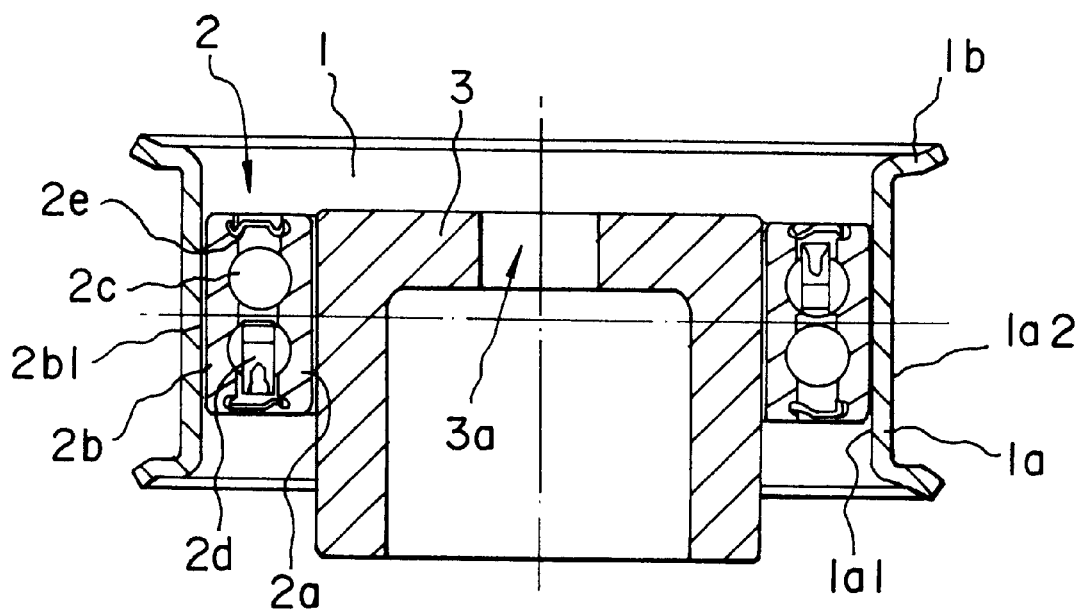
FIG. 1 is a longitudinal section of an idler pulley according to an embodiment of the invention.

As shown in FIG. 1, an idler pulley according to an embodiment of the invention comprises a pulley main body 1 adapted to have a belt entrained therearound, a ball bearing 2 fitted in the pulley main body 1, and a shaft member 3 fitted in the inner ring 2a of the ball bearing 2.

Figure 2:
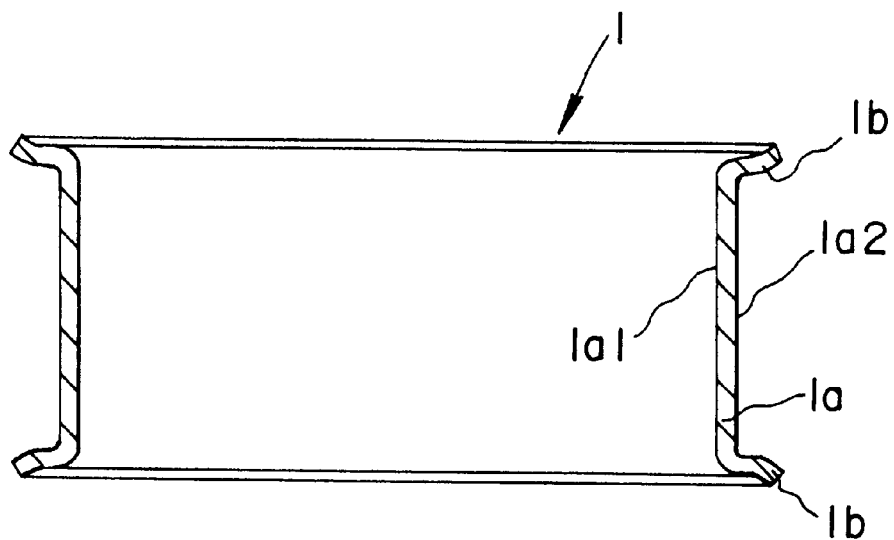
FIG. 2 is a longitudinal section of a pulley main body according to an embodiment of the invention.

The pulley main body 1 is made of steel sheet of a press machine, and as shown in FIG. 2 it is in the form of an annular body comprising a cylindrical portion 1a, and flange portions 1b extending radially outward from the opposite ends of said cylindrical body 1a. The cylindrical portion 1a has on its outer side an inner surface 1a1 having the outer ring 2b of the ball bearing 2 fitted thereto, and on its inner side a pulley peripheral surface 1a2 adapted to be contacted by an unillustrated belt. In order to prevent creep, the inner surface 1a1 of the cylindrical portion 1a is plated with zinc, which is a metal whose Young's modulus is lower than those of the pulley main body 1 and the outer ring 2b of the ball bearing 2, the plating layer being 5–20 μm in thickness. Further, it is preferably that the width of the inner surface 1a1 of the cylindrical portion 1a be greater than that of the outer ring 2b of the ball bearing 2 to permit some creep. The flange portions 1b are provided in order to guide the belt which contacts the pulley peripheral surface 1a2.

The ball bearing 2 comprises on outer ring 2b fitted in the cylindrical portion 1a of the pulley main body 1, an inner ring 2a fitted on the shaft member 3, a plurality of balls 2c installed between the raceway surfaces of the inner and outer rings (2a, 2b), a cage 2d holding the balls 2c in circumferentially equispaced relation, and a pair of seals 2e for sealing grease.

The shaft member 3 is fitted in the inner ring 2a of the ball bearing 2, and is centrally formed with a joining hole 3a which receives an unillustrated fixing bolt.

That is, the pulley main body 1 is attached to the fixing shaft through the shaft member 3 and ball bearing 2, and a belt is entrained around the pulley peripheral surface 1a2, so that the pulley is rotated in response to the peripheral movement of the belt, thus fulfilling the role of an idler.

Figure 3:
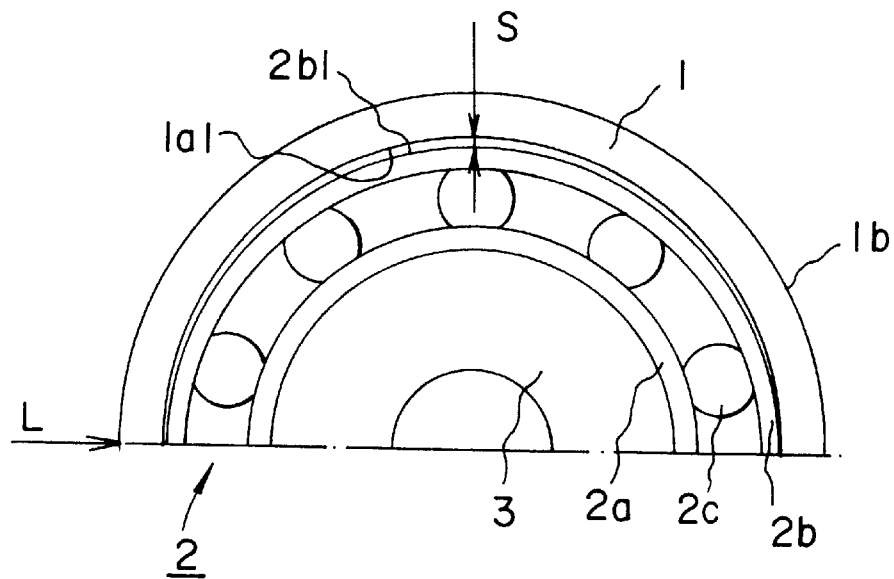
FIG. 3 is a side view of an idler pulley according to an embodiment of the invention.

As described above, the idler pulley, with a belt entrained therearound, is subjected to a radial force L produced by the belt tension. Thus, as shown in FIG. 3, as in the case of a conventional idler pulley, in the non-leaded region there develops a slight clearance s between the inner surface 1a1 of the pulley main body 1 and the outer surface 2b1 of the outer ring 2b of the ball bearing 2. This clearance s, as shown in said table 1, becomes wider as the tension of the entrained belt increases, weakening the joining force between the pulley main body 1 and the outer ring 2b of the ball bearing 2.

The idler pulley in the embodiment described above is such that the zinc for plating applied to the inner surface 1a1 of the pulley main body 1 is a soft metal whose Young's modulus is lower than those of the pulley main body 1 and the outer ring 2b of the bearing 2; therefore, the zinc plating layer is elastically deformed, acting to fill the clearance s. Therefore, even if the belt tension increases, this idler pulley, unlike the conventional idler pulley, does not decrease in the joining force, being capable of preventing phenomena such as the creep.

Figure 4A:
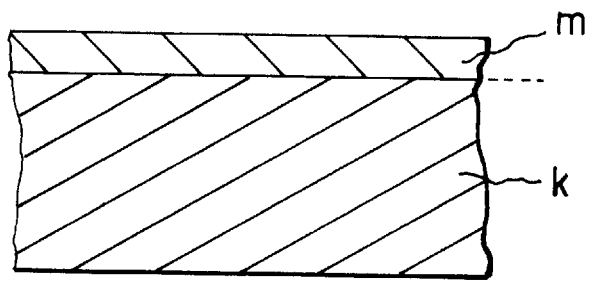
FIG. 4(A) is a sectional view of a zinc plating layer and FIG. 4(B) is a sectional view of a phosphate coating.
Figure 4B:
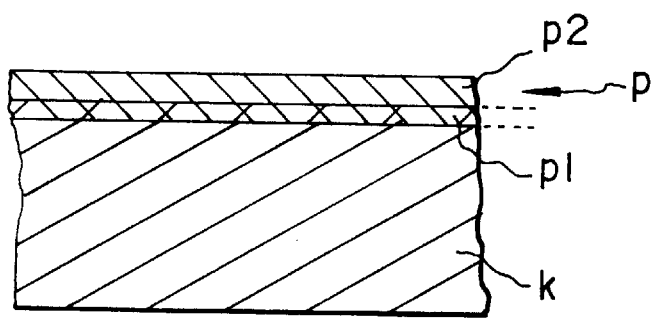

To make sure of the effects of this zinc plating, an idler pulley of 72 mm in outer diameter (the outer diameter of the pulley peripheral surface 1a2 of the pulley main body 1) having a conventional phosphate coating, and the idler pulley in the above embodiment having a zinc plating layer of 5–10 $\mu$m in thickness were tested with belts respectively entrained therearound; the pulleys were rotated at 1,500 rpm while the belt tension was gradually increased to measure the value of the tension at which a creep phenomenon occurred. The zinc plating m and the phosphate treatment film p in this test, as shown in FIG. 4(A) and (B), were applied to respective metal blanks k to a thickness of 5–10 $\mu$m. Of these, the phosphate treatment film p comprises a compound coating p1 formed while chemically reacting with the surface of the metal blank, and a surface layer p2 which is a phosphate coating of 2–4 $\mu$m in thickness formed thereon.

In this test, whereas the conventional idler pulley (having a phosphate treatment film p) developed a creep phenomenon when the belt tension was 80 kgf, the idler pulley (zinc-plated) in the above embodiment produced on creep phenomenon until 250 kgf. This result shows that the idler pulley in the above embodiment can withstand more than three times as high a load that the conventional idler pulley can withstand.

An embodiment of the invention will now be described.

An idler pulley according to the invention is characterized in that a layer of a metal whose Young's modulus is lower than those of the pulley main body and the outer ring of the bearing is interposed between the inner surface of the pulley main body of steel sheet and the outer surface of the outer ring of the bearing. The main layer is not limited to plating as in the above embodiment; for example, it may be in the form of a thin metal film of 5–20 $\mu$m in thickness wound around the outer ring of the bearing, the outer ring being then force-fitted in the pulley main body. Further, when plating is to be employed, it may be applied to the outer surface of the outer ring of the bearing. However, since such metal layer is intended to prevent creep from taking place in the pulley main body and the outer ring of the bearing, as described above, a thickness of at least 5 $\mu$m is required and if consideration is given to factors, such as convenience for forcer-fitting operation, fit, and a variation in the bearing clearance resulting from the force fitting, the thickness is preferably 5–20 $\mu$m.

Further, in the above embodiment, zinc has been used as a metal whose Young's modulus is lower than those of the pulley main body of steel sheet, and the like; however, such metal is not limited to zinc, and other metals, such as tin, gold, silver, and copper, may be used.

In addition, the construction of the bearing and shaft member, and the shape of the flange portions, the pulley peripheral surface of the pulley main body, and the like are subject to various changes which are suited for the object of the invention. For example, the bearing is not limited to the double row type as illustrated and may be of the single row type. Further, the inner ring of the bearing may be omitted and instead the raceway surface may be formed directly on the shaft member.

What is claimed is:

1. An idler pulley in which a pulley main body of steel sheet having a pulley peripheral surface adapted to have a belt entrained therearound is force-fitted on the outer ring of a rolling bearing, said idler pulley being characterized in that a layer of a metal whose Young's modulus is lower than those of the pulley main body of steel sheet and the outer ring of the rolling bearing is interposed between said pulley main body of steel sheet and the outer ring of the rolling bearing, the thickness of the metal layer being 5–20 $\mu$m, wherein the metal elastically deforms to fill a clearance defined between the pulley main body of steel plate and the outer ring of the rolling bearing when a load is applied to the pulley main body.

2. An idler pulley in which a pulley main body of steel sheet having a pulley peripheral surface adapted to have a belt entrained therearound is force-fitted on the outer ring of a rolling bearing, said idler pulley being characterized in that a metal whose Young's modulus is lower than those of said pulley main body of steel sheet and the outer ring of the rolling bearing is plated on at least one of the inner surface of the pulley main body of steel sheet and the outer surface of the outer ring of the bearing, the thickness of the plating being 5–20 $\mu$m, wherein the metal elastically deforms to fill a clearance defined between the pulley main body of steel plate and the outer ring of the rolling bearing when a load is applied to the pulley main body.

3. An idler pulley as set forth in claim 1 or 2, characterized in that said metal whose Young's modulus is lower than those of said pulley main body of steel sheet and the outer ring of the rolling bearing is a member selected from the group consisting of zinc, tin, gold, silver, and copper.

4. An idler pulley as set forth in claim 1 or 2, characterized in that said pulley main body of steel sheet has a greater width than that of the outer ring of the bearing.

5. An idler pulley as set forth in claim 2, wherein said metal is plated on the inner surface of the pulley main body of steel sheet.

6. An idler pulley as set forth in claim 2, wherein said metal is plated on the outer surface of the outer ring of the bearing.

7. An idler pulley as set forth in claim 2, wherein said metal is plated on both the inner surface of the pulley main body of steel sheet and the outer surface of the outer ring of the bearing.

* * * * *